United States Patent
Bushee et al.

(10) Patent No.: US 7,249,122 B1
(45) Date of Patent: Jul. 24, 2007

(54) METHOD AND SYSTEM FOR AUTOMATIC HARVESTING AND QUALIFICATION OF DYNAMIC DATABASE CONTENT

(75) Inventors: William J. Bushee, Sioux Falls, SD (US); Thomas W. Tiahrt, Sioux Falls, SD (US); Michael K. Bergman, Sioux Falls, SD (US)

(73) Assignee: BrightPlanet Corporation, Sioux Falls, SD (US)

( * ) Notice: Subject to any disclaimer, the term of this patent is extended or adjusted under 35 U.S.C. 154(b) by 777 days.

(21) Appl. No.: 09/911,522

(22) Filed: Jul. 24, 2001

(51) Int. Cl.
*G06F 17/30* (2006.01)

(52) U.S. Cl. .............. 707/3; 707/2; 707/10; 709/203; 709/219

(58) Field of Classification Search ............. 707/1, 707/3, 5, 2, 104.1, 10; 709/203, 219
See application file for complete search history.

(56) References Cited

U.S. PATENT DOCUMENTS

| | | | |
|---|---|---|---|
| 6,018,733 A * | 1/2000 | Kirsch et al. ............... 707/3 |
| 6,078,914 A * | 6/2000 | Redfern ....................... 707/3 |
| 6,237,011 B1 * | 5/2001 | Ferguson et al. ......... 715/515 |
| 6,553,364 B1 * | 4/2003 | Wu .............................. 707/1 |
| 6,704,729 B1 * | 3/2004 | Klein et al. ................... 707/5 |
| 2001/0056414 A1 * | 12/2001 | Christal et al. ............. 707/1 |
| 2002/0007374 A1 * | 1/2002 | Marks et al. ............. 707/513 |

OTHER PUBLICATIONS

CSA—Databases & Collections, www.csa.com.*

* cited by examiner

*Primary Examiner*—Leslie Wong
(74) *Attorney, Agent, or Firm*—Patterson, Thuente, Skaar & Christensen, P.A.

(57) ABSTRACT

A method and system for the automatic harvesting and qualification of dynamic database content for efficiently providing highly relevant and timely information in response to a user's queries. The method includes obtaining an initial categorization structure for organizing a plurality of subject areas of information, obtaining a plurality of parametric information lists for optimizing operation to a user's requirements, acquiring a listing of qualified databases from candidate database listing by matching candidate databases to a plurality of subject areas, obtaining a query from the user, the query being associated with a subject area, submitting a query to the qualified databases, acquiring a collection of responsive content from the qualified databases, indexing the responsive content to form an index for facilitating searching the collection, and publishing a summary of the collection for review by the user.

25 Claims, 4 Drawing Sheets

METHOD AND SYSTEM FOR AUTOMATIC HARVESTING AND QUALIFICATION OF DYNAMIC DATABASE CONTENT

INCORPORATION BY REFERENCE

This patent application discloses an invention of a system integrating multiple constituent systems. These constituent systems are disclosed and described in the following co-pending patent applications, all of which are subject to an obligation of assignment to the same person. The disclosures of these applications are herein incorporated by reference in their entireties.

METHOD FOR AUTOMATIC SELECTION OF DATABASES FOR SEARCHING, William J. Bushee, Filed Jul. 24, 2001, application Ser. No. 09/911,452, now U.S. Pat. No. 6,711,569, issued Mar. 23, 2004.

AUTOMATIC SYSTEM FOR CONFIGURING TO DYNAMIC DATABASE SEARCH FORMS, William J. Bushee, Filed Jul. 24, 2001, application Ser. No. 09/911,435, still pending.

SYSTEM AND METHOD FOR EFFICIENT CONTROL AND CAPTURE OF DYNAMIC DATABASE CONTENT, William J. Bushee and Thomas w. Tiahrt, Filed Jul. 24, 2001, application Ser. No. 09/911,434, still pending.

SYSTEM FOR AUTOMATICALLY CATEGORIZING CONTENT IN HIERARCHICAL SUBJECT STRUCTURES, Thomas W. Tiahrt, Michael K. Bergman, and William J. Bushee, Filed Jul. 24, 2001, application Ser. No. 09/911,433, still pending.

SYSTEM AND METHOD FOR FLEXIBLE INDEXING OF DOCUMENT CONTENT, Thomas W. Tiahrt, Filed Jul. 24, 2001, application Ser. No. 09/911,432, now U.S. Pat. No. 6,741,979, issued May 25, 2004.

SYSTEM FOR AUTOMATICALLY CREATING SYNTHETIC SUMMARIES FROM DOCUMENT CONTENT, Thomas W. Tiahrt, William J. Bushee, and Michael K. Bergman, Filed Jul. 24, 2001, application Ser. No. 09/911,431, still pending.

BACKGROUND OF THE INVENTION

1. Field of the Invention

The present invention relates to search engines and database searching techniques and more particularly pertains to a new method and system for automatic harvesting and qualification of dynamic database content for efficiently providing highly relevant and timely information in response to user's queries.

2. Description of the Prior Art

Many enterprises, whether business, governmental, or any other organized undertaking, require large amounts of "current" information to be analyzed and available for use in the daily execution of their activities. Often the informational needs of the enterprise can be categorized into discrete subject areas or domains. Each of these domains may have additional divisions providing increasing granularity or specificity of the subject matter.

Since its inception, the Internet has held the promise of real-time access to an almost inexhaustible supply of information, stored on computers throughout the world, in near real time. However, sorting through the information available to find documents relevant to a given question or query can be laborious; and a method to speed this process was needed. Search engines are known in the prior art and allow a user to search for sites that have some keyword corresponding to the user's query. While it is true that millions of documents are readily available as static pages to users through search engines, much more of the total content of the Internet, in the form of dynamic content, has remained relatively difficult to access through more conventional search engine techniques. For the purpose of clarity, a static page of a network database provides the same content to virtually every user accessing the database, usually in the form of the same document or page (or set of documents or pages). A dynamic network database presents dynamic content to each user accessing the database, and the dynamic content usually comprises unique documents or pages that are in response to and are based at least in part on the user's query.

The dynamic content, while available, often requires independent knowledge of the exact location of the document, sophisticated search techniques, or in many cases the use of professional researchers to attempt to "mine" the needed information.

Additionally, the resources required to evaluate all of the information identified by a conventional search engine in order to filter out non-relevant information can be more than substantial. The resources used may include, by way of example and not limitation, transmission bandwidth, data storage, and time (both of system usage and of personnel) required to filter out related but not relevant information. The need to capture and organize relevant information can be overwhelming, and an automated system is required to effectively solve this problem.

In these respects, the method and system for automatic harvesting and qualification of dynamic database content according to the present invention substantially departs from the conventional concepts and designs of the prior art, and in so doing provides a system primarily developed for the purpose of efficiently providing highly relevant and timely information in response to user's queries.

SUMMARY OF THE INVENTION

In view of the foregoing disadvantages inherent in the known types of search engines and database searching techniques now present in the prior art, the present invention provides a new method and system for automatic harvesting and qualification of dynamic database content construction wherein the same can be utilized for efficiently providing highly relevant and timely information in response to user's queries.

The invention contemplates a method for the automatic harvesting and qualification of dynamic database content. The method may include obtaining an initial categorization structure for organizing a plurality of subject areas of information, obtaining a plurality of parametric information lists for optimizing operation to a user's requirements, acquiring a listing of a plurality of qualified databases from said candidate database listing by matching each one of a candidate databases to said plurality of subject areas, obtaining a query from the user, said query being associated with a subject area, submitting said query to said plurality of qualified databases, acquiring a collection of responsive content from said plurality of qualified databases, indexing said responsive content to form an index of facilitating searching said collection of responsive content, and publishing a summary of said collection of responsive content for review by the user. The invention also contemplates a system for carrying out the various aspects of the method.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
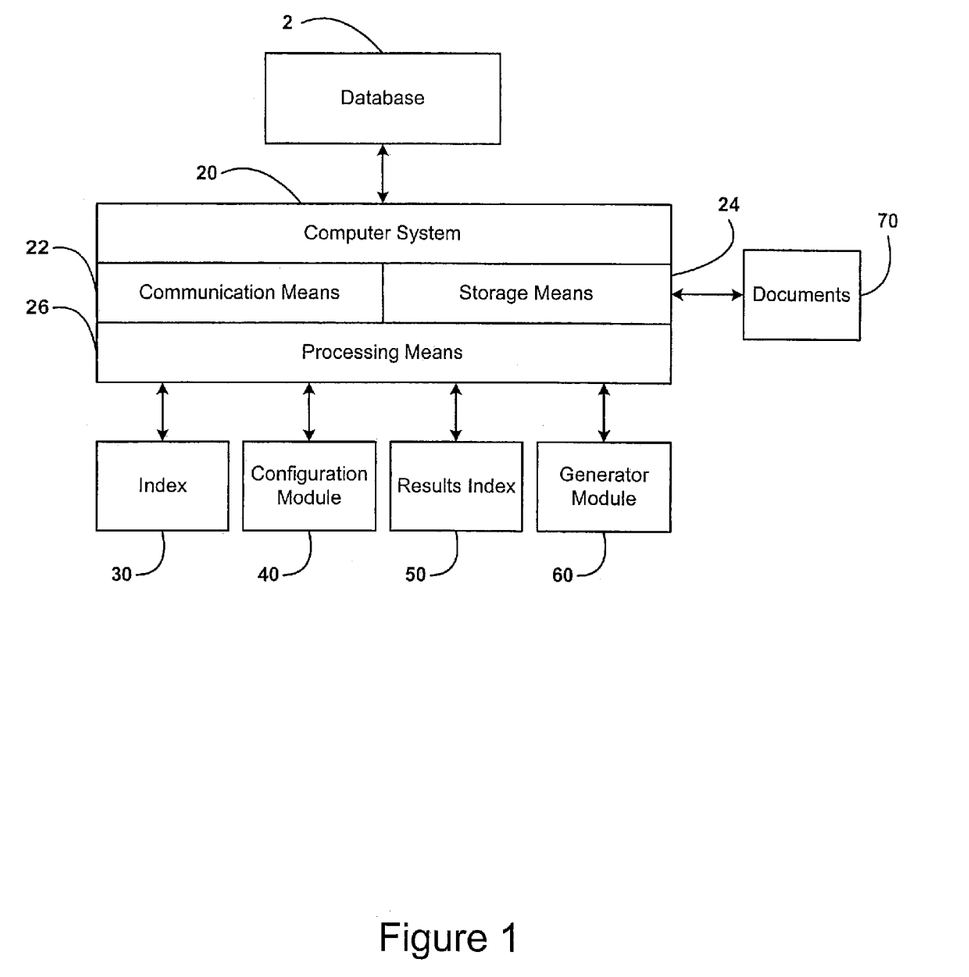
FIG. 1 is a schematic functional interconnect view of a new method and system for automatic harvesting and qualification of dynamic database content according to the present invention.

A system and method for automatic harvesting and qualification of dynamic database content is disclosed herein. In the embodiment disclosed in FIG. 1, at least one database 2 is communicatively coupled with a computer system 20. The computer system 20 includes a communication means 22. In various embodiments, the communication means 22 is for communicating with at least one other computer including a database to facilitate the two-way flow of information between said computer system and at least one other computer. In various embodiments, the computer system 20 includes a storage means 24. In various embodiments, the storage means is for retention and recall of data communicated by or to the at least one other computer. In various embodiments, the storage means 24 is capable of storing documents 70. In various embodiments, the computer system 20 includes a processing means 26. In various embodiments, the processing means is for executing multiple software modules and performing comparisons between a user supplied query and a plurality of documents found in at least one other computer. In various embodiments, the system and method for automatic harvesting and qualification of dynamic databases includes an index 30. In various embodiments, the index 30 is communicatively coupled to the processing means 26. In various embodiments, the index 30 is for storing a plurality of pre-approved internet sites to be included in a series of queries. In various embodiments, the system and method for automatic harvesting and qualification of dynamic databases includes a configuration module 40. In various embodiments, the configuration module 40 is communicatively coupled to the processing means 26. In various embodiments, the configuration module 40 is adapted for translating a generic query into site-specific dialects such that a single user defined query may be directed to multiple sites automatically. In various embodiments, the system and method for automatic harvesting and qualification of dynamic databases includes a selection module. In various embodiments, the selection module is adapted for characterizing a plurality of documents returned by at least one database of at least one other computer and associated with a user defined query. In various embodiments, the system and method for automatic harvesting and qualification of dynamic databases includes a results index 50. In various embodiments, the results index 50 is communicatively coupled to the processing means 26. In various embodiments, the results index 50 allows for rapid recovery of specific portions of any one of a plurality of documents characterized by the selection module. In various embodiments, the system and method for automatic harvesting and qualification of dynamic databases includes a generator module 60. In various embodiments, the generic module 60 is for automatically generating at least one results page for the user conveying information associated with any one of a plurality of documents associated with a query.

The system for automatic harvesting and qualification of dynamic database content of the invention (see FIGS. 1 through 4) performs a plurality of major functions, which may include acquisition of databases to be queried, acquisition of dynamic content in response to the query, indexing the dynamic content, and publication of the results. The system's major modes of operation include an initial capture of dynamic content which is referred to as a "harvest". Additionally a query servicing mode is also incorporated into the system. The harvest will be described in the following several paragraphs. The query servicing mode will be described in terms of differences from the initial harvest. It is noted that the system works equally well with static content databases, but the full advantages of the system are exploited when working with dynamic content databases. From this point forward the term "content" is assumed to encompass both dynamic content as well as static content.

Figure 2:
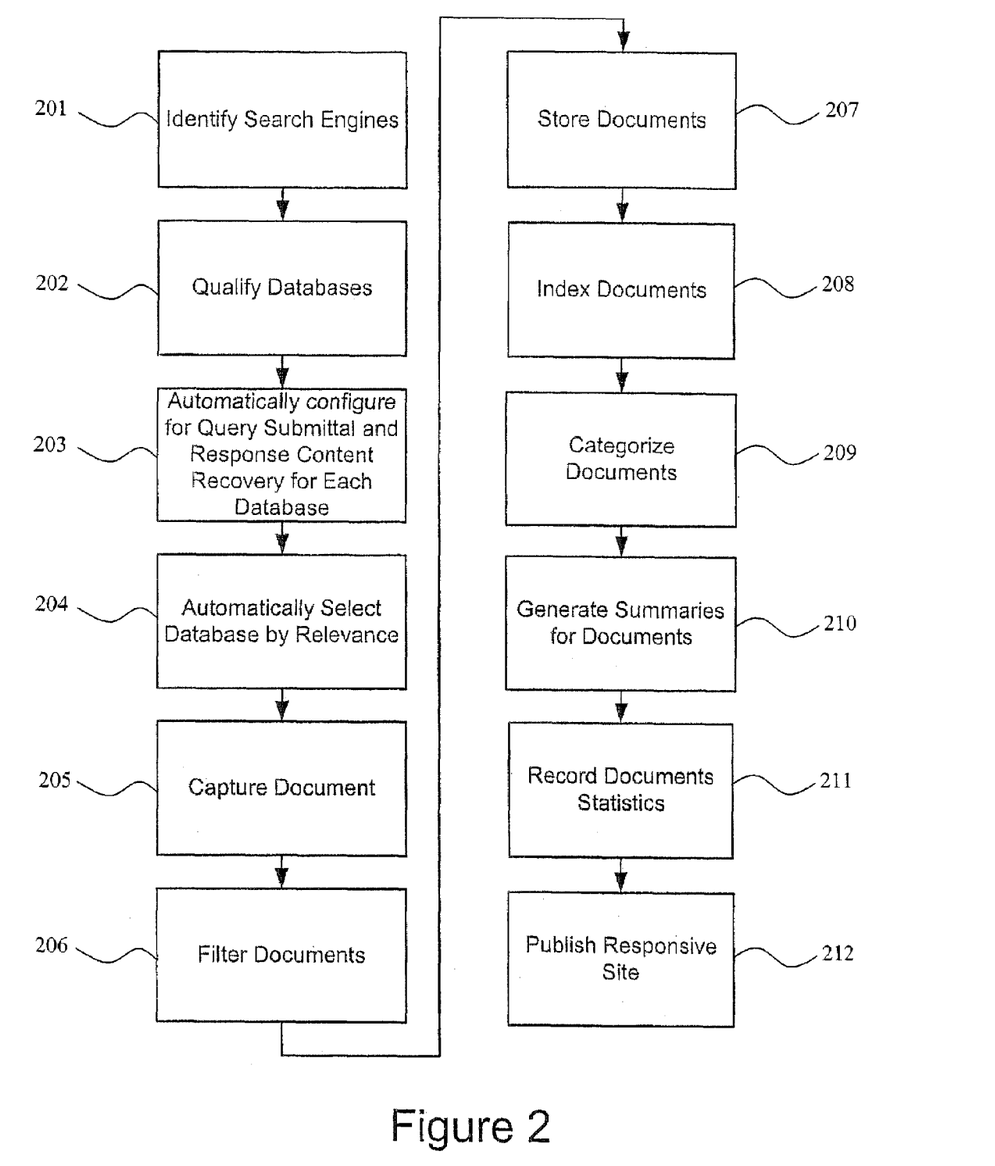
FIG. 2 is a schematic functional flow diagram view of the present invention.

The system obtains an initial listing of databases, an initial categorization structure defining the information domain, and a plurality of parametric information lists. The system begins the acquisition of databases by matching the query or queries to the database to provide content which is highly relevant to the query or queries. The term query as used herein is presumed to include one or more queries.

The system uses a first one of the parametric information lists is a candidate database list, which provides an extensive group of candidate databases to be considered 201. The candidate databases can extend into the tens of thousands to hundreds of thousands. For example, on the Internet today, it is estimated there may be perhaps on the order of 250,000 searchable dynamic databases.

Figure 3:
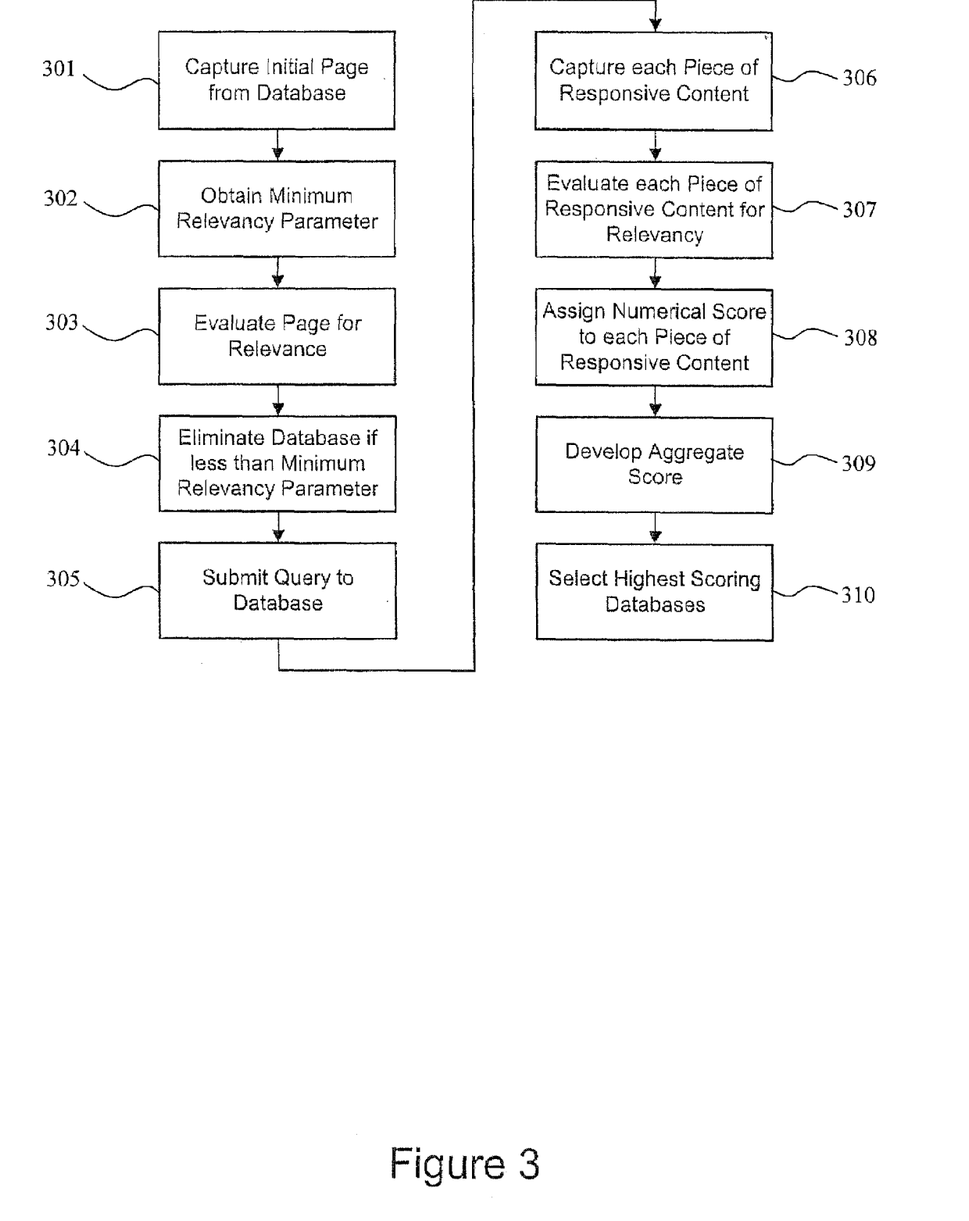
FIG. 3 is a schematic functional flow diagram of the selection module view of the present invention.

An initial page from each of the initial listing of databases is captured 301. The initial page presented by each candidate database is evaluated for relevance 303 to the specific domain and subclassification of information or subject area 202. Any database which is determined to not be relevant to the subject area is removed from consideration for that subject area 304. A number of the remaining databases are selected for further consideration. The specific number of databases selected may be limited by a user-defined parameter 302 (such as a database relevancy parameter), which establishes a minimum threshold of relevancy for any given subject area.

Each of the selected databases may have a unique set of requirements for submitting queries and retrieving documents. In order to facilitate the efficient harvest to content, each of the selected databases is analyzed for these requirements and a configuration file is created. For each database, the configuration file may serve as a translator between a generic query established by the user and the unique requirements of each database. The configuration file provides the system with information for the proper submission of queries and retrieval of responses for each one of the selected databases 203.

Thus, in the course of acquiring the plurality of qualified databases, the initial page from each one of the qualified databases may be analyzed for formatting purposes. For example, an input location may be determined on the initial page for passing queries by the initial page to each one of the plurality of databases, results locations may be determined for capturing search results returned from each one of the plurality of databases, and the input location and the results locations may be recorded for use in formatting queries for each one of the databases. As this information is collected, it may be added to the configuration file.

Each of the selected and configured databases is then again evaluated for relevance to the subject area 204. A sample query from the subject area is submitted to each of the selected databases 305. Responsive pages or documents are then gathered from each of the databases 306. These responsive documents are evaluated for relevance to the subject area 307. Each of the databases is assigned a numerical score representing relevance to the subject area 308. An aggregate score may be developed 309. Databases with a sufficiently high numerical score are then qualified for use in the subject area 310. A different collection of databases may be qualified for each subject area. The qualified databases are then used for the next major function: document acquisition.

The system uses the qualified databases and the initial categorization structure (such as a collection of subject matter areas) along with a series of queries to perform an initial harvest of content. The queries are queued and submitted to qualified databases. The responsive content from each database is captured and stored in a central location.

A difference between the initial harvest and the query servicing modes occurs at this point in the overall process. In an initial harvest the responsive content is captured or downloaded from the qualified database 205, 207. In the query servicing mode, the central location is checked for the document before resorting to downloading the document from the source database. If the central location has a current copy of the document, the systems resources are not used to download a new copy from the source database.

The system next performs the major function of indexing the content 208 for facilitating searching of the content. Here again is a difference between the initial harvest and query servicing modes. The index is created for documents qualified after the initial harvest. The index is used to find content matching a query during the query servicing mode.

Figure 4:
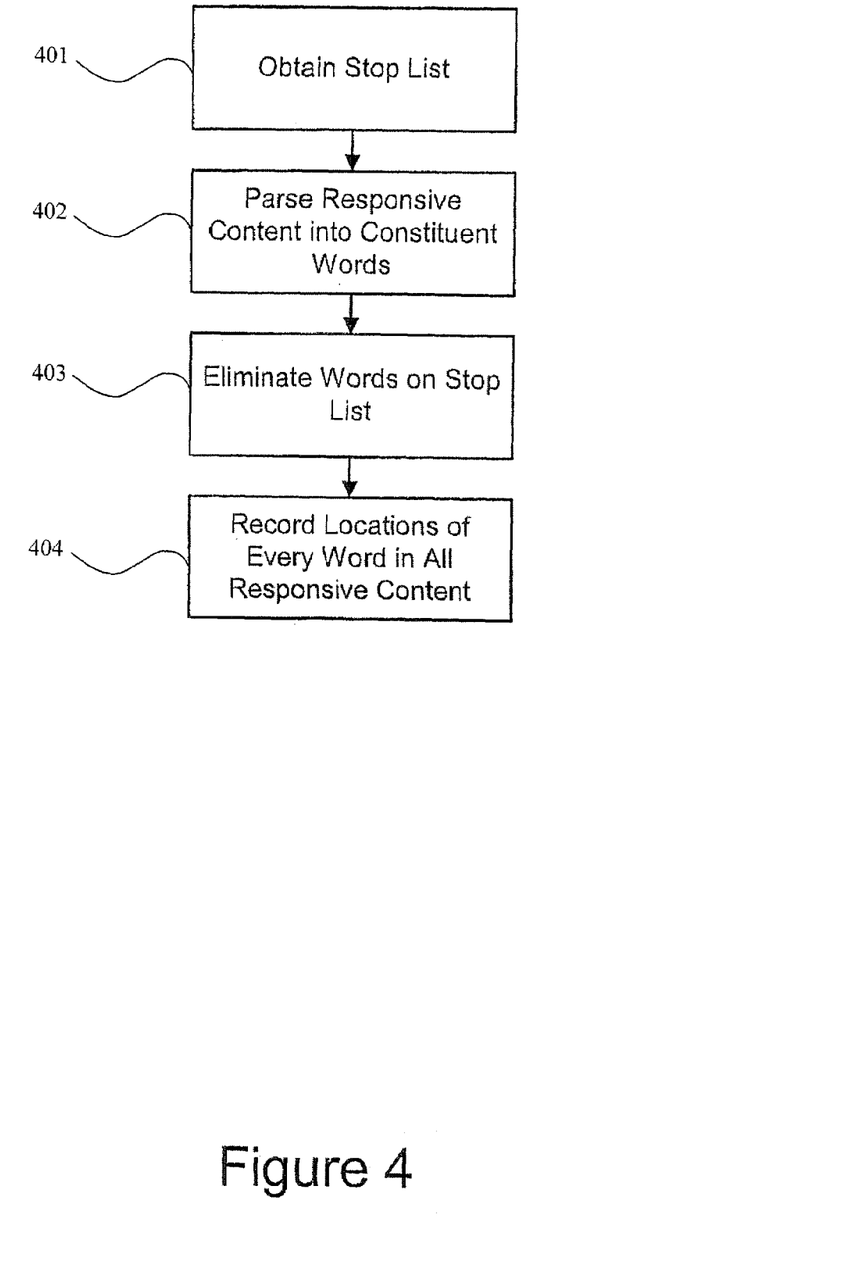
FIG. 4 is a schematic functional flow diagram of the results index view of the present invention.

The system parses each piece of content into constituent words 402 for processing. The system then compares each of the words to a fourth one of the parametric list (such as a stop list) 401, 206. A stop list contains terms which have been determined not to add value to the index, and therefore these terms are not processed. Each word, which is not on the stop list, is then stemmed into its base prefix (such as a stem word) to facilitate efficient indexing. The words on the stop list are eliminated 403. The location of each stem word in every piece of content is then recorded 404 in the index, such that a user can search for any term based upon its corresponding stem word throughout the entire collection of content or documents through the index.

A summary of each piece of content may be created 210 if a summary was not provided by the qualified database. The summary may provide a listing of keywords relevant to the subject area, or an extract of a particularly relevant portion of the piece of content. This is especially important for content taken from large databases of documents (such as, for example, patent databases) where summaries for each document are typically not provided or available.

As a final step in the indexing process, the system records a plurality of statistics associated with each piece of content 211. Illustratively, the plurality of statistics may include, but is not limited to: the title of the piece of content, the number of internal links in the piece of content, the number of external links in the piece of content, the number of terms in the piece of content, the length of the piece of content, the database which provided the piece of content, and whether the content was static or dynamic.

The indexing operation may also include recording a set of statistics describing the collection of content as a whole. In a preferred embodiment these statistics may include the number of pieces of content, the average number of terms per piece of content, the standard deviation of the number of terms, the total number of bytes to store the collection of content, and the total number of terms in the collection of content.

After all of the queries have been submitted to the qualified databases and the responsive content has been captured 205 and stored 207 in a central location, the system matches each piece of responsive content to the initial categorization structure. The initial categorization structure is a tree configuration with each domain being a first level of classification and each sub-classification being a branch depending from the first level of classification or another sub-classification. After this match has been performed, the system filters the categorization structure. This filtering may include a check for duplicate documents matched to the same classification, limiting the number of documents matched to any one classification or sub-classification based on a user defined parameter (such as a population parameter), and limiting the number of classifications or sub-classifications to which any one piece of content may be matched, based on a user defined parameter (such as an occurrence parameter). Additionally, the system may use a second parametric listing (such as an exclusion list) and a third parametric listing (such as an inclusion list) to inhibit matches or restrict matches (respectively) based upon a predetermined listing of terms and database sources for each subject area. After the filtering is complete, a categorization file is created 209 which records the matches of the stored copies of the responsive content for each subject area.

Finally, the system generates pages facilitating the recall of any piece of content in associate with a user's query 212. The user may submit a query to the system. The system will then match the query to the harvested content and return a page providing a listing of each relevant piece of content in the collection, along with a summary of the piece of content.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method implemented on an information handling system for the automatic harvesting and qualification of dynamic database content comprising:
   obtaining an initial categorization structure for organizing a plurality of subject areas of information;
   obtaining a plurality of parametric information lists for optimizing operation to a user's requirements;
   obtaining a candidate database listing having a plurality of candidate databases each having a collection of content;
   acquiring a listing of a plurality of qualified databases from said candidate database listing by matching one of a candidate databases to said plurality of subject areas of information;
   obtaining a query from a user, said query being associated with a subject area;
   submitting said query to said plurality of qualified databases;
   acquiring a collection of responsive content from said plurality of qualified databases;
   indexing said responsive content to form an index of facilitating searching said collection of responsive content;
   publishing a summary of said collection of responsive content for review by the user.

2. The method of claim 1, wherein said step of obtaining a plurality of parametric information lists further comprises:
   obtaining an exclusion list providing a plurality of terms and sources to inhibit associations for said step of acquiring a collection of responsive content;
   obtaining an inclusion list providing a plurality of terms and sources restricting associations for said step of acquiring a collection of responsive content;
   obtaining a stop list providing a plurality of terms to be excluded for said step of indexing said responsive content.

3. The method of claim 1, wherein said step of acquiring a plurality of qualified databases further comprises:
   capturing an initial page from each one of said plurality of candidate databases;
   evaluating said initial page for relevancy to said each one of said subject areas of information;
   selecting databases according to relevance to said subject areas of information;
   associating said selected databases with said subject areas of information.

4. The method of claim 3, further comprising:
   obtaining a database relevancy parameter for restricting qualification of databases below a minimum threshold value;
   comparing the relevance of each initial page to said relevancy parameter;
   removing each candidate database with a relevancy below said minimum threshold value from qualification.

5. The method of claim 3, wherein said step of acquiring a plurality of qualified databases further comprises:
   submitting a query to each of said selected databases;
   capturing a plurality of pieces of responsive content provided by each of said selected databases;
   evaluating each of said plurality of pieces of responsive content for relevancy to said query;
   assigning a numerical score to each one of said plurality of pieces of responsive content, said numerical score representing a degree of relevance to said query;
   developing an aggregate score for each one of said select databases;
   qualifying a portion of said selected databases based upon said aggregate score.

6. The method of claim 5, wherein said step of capturing a plurality of pieces of responsive content further comprises:
   obtaining a content parameter limiting the number of pieces of content to be captured from each of said selected databases;
   obtaining an initial weighting of each of said pieces of responsive content from said selected database;
   selecting a quantity of pieces of responsive content limited by said content parameter such that pieces of responsive content with relatively greater initial weighting are selected before pieces of responsive content with a relatively lesser initial weighting.

7. The method of claim 1, wherein said step of acquiring a plurality of qualified databases further comprises:
   capturing an initial page from each of said plurality of candidate databases;
   evaluating said initial page for relevancy to said each of said subject areas;
   obtaining a database relevancy parameter for restricting the qualification of databases below a minimum threshold value;
   comparing the relevance of each initial page to said relevancy parameter;
   removing each candidate database with a relevancy below said minimum threshold value from qualification;
   selecting databases according to relevance to said subject areas;
   submitting a query to said selected databases;
   capturing a plurality of pieces of responsive content provided by said selected databases;
   obtaining a content parameter limiting the number of pieces of content to be captured from said selected databases;
   obtaining an initial weighting of each of said pieces of responsive content from said database;
   selecting a quantity of pieces of responsive content limited by said content parameter such that pieces of responsive content with a relatively greater initial weighting are selected before pieces of responsive content with a relatively lesser initial weighting;
   evaluating each of said plurality of pieces of responsive content for relevancy to said query;
   assigning a numerical score to each of said plurality of pieces of responsive content, said numerical score representing a degree of relevance to said query;
   developing an aggregate score for each of said selected databases;
   qualifying apportion of said selected databases based upon said aggregate score to be polled for content;

associating said qualified databases with said subject areas.

8. The method of claim 1, wherein said step of acquiring a plurality of qualified databases further comprises:
analyzing an initial page from each one of said plurality of qualified databases for formatting;
determining an input location on said initial page for passing queries from said initial page to each one of said plurality of databases;
determining results locations for capturing search results returned from each one of said plurality of databases;
recording said input location and said results locations for use in formatting queries for each one of said databases.

9. The method of claim 1, wherein said step of acquiring a collection of responsive content further comprises:
comparing said piece of responsive content to each one of said subject areas in said initial categorization structure;
matching each piece of responsive content to subject areas based on relevance of the responsive content to the subject areas;
filtering machines to optimize said categorization structure.

10. The method of claim 9, wherein said step of filtering matches further comprises:
removing duplicate pieces of responsive content;
obtaining a population parameter for limiting a number of pieces of responsive content which may be matched to any one subject area;
obtaining an occurrence parameter for limiting a number of subject areas to which any one piece of responsive content may be matched;
restricting matches for each one of said subject areas according to said occurrence parameter and said population parameter.

11. The method of claim 9, wherein said step of filtering matches further comprises:
obtaining an exclusion list to inhibit matches based on predetermined words and sources;
obtaining an inclusion list to restrict matches based on predetermined words and sources;
matching each piece of responsive content with subject areas according to said exclusion list and said inclusion list.

12. The method of claim 9, further comprising:
creating a categorization file for recording matches between each piece of responsive content and each subject area;
saving said categorization file to a storage medium for use in searching said collection of responsive content.

13. The method of claim 1, wherein said step of indexing said responsive content further comprises:
obtaining a stop list providing a list of words not to be indexed;
parsing each piece of responsive content into constituent words;
eliminating words of said responsive content occurring on said stop lists;
recording a location of every occurrence of constituent words in said collection of responsive content.

14. The method of claim 1, wherein said step of publishing a summary further comprises:
determining if a summary is provided for each piece of said responsive content;
examining each piece of said responsive content for keywords associated with each subject area;
developing a keyword summary score for each piece of responsive content;
examining each piece of said responsive content for relevant extracts forming an extract summary;
developing an extract score for each piece of responsive content;
comparing said keyword summary score to said extract score for a summary composite score;
selecting said keyword summary if a predetermined summary value is exceeded by said summary composite score;
selecting said extract summary if a predetermined summary value if not exceeded by said summary composite score.

15. The method of claim 1, wherein said step of acquiring a plurality of qualified databases further comprises:
analyzing an initial page from each one of said plurality of qualified database for formatting;
determining an input location on said initial page for passing queries by said initial page to each one of said plurality of databases;
analyzing a results page from each one of said plurality of qualified databases for formatting;
determining results locations on said results page for capturing search results returned from each one of said plurality of databases;
recording said input location and said results locations for use in formatting queries for each one of said databases.

16. The method of claim 1, wherein said step of acquiring a listing of a plurality of qualified databases further comprises acquiring a listing of a plurality of qualified databases each generating dynamic responses based upon a user query.

17. The method of claim 1, further comprising the step of generating at least one summary comprising at least one extract of relevant content taken directly from an associated at least one item in said collection of responsive content from said plurality of qualified databases.

18. A system for the automatic harvesting and qualification of dynamic database content comprising:
a computer system having a communication means for communication with at least one other computer including a database to facilitate a two-way flow of information between said computer system and the at least one other computer;
said computer system having a storage means for retention and recall of data communicated by or to the at least one other computer;
said computer system having a processing means for executing multiple software modules and performing comparisons between a user supplied query and a plurality of documents found in at least one other computer;
an index for storing a plurality of pre-approved internet sites to be included in a series of queries;
a configuration module adapted for translating a generic query into site-specific dialects such that a single user defined query may be directed to multiple sites automatically;
a selection module adapted for characterizing said plurality of documents returned by the database of the at least one other computer associated with said user defined query;
a results index to allow for rapid recovery of specific portions of any one of said plurality of documents characterized by said selection module; and a generator module for automatically generating at least one results page for the user conveying information associated with any one of said plurality of documents associated with said query.

19. The method of claim 18, wherein characterizing said plurality of documents includes categorizing said plurality of documents.

20. The method of claim 18, wherein characterizing said plurality of documents includes evaluating said plurality of documents using parametric information lists.

21. The method of claim 18, wherein the selection module is further adapted to use one or more of the following to characterize said plurality of documents:
   an exclusion list to provide a plurality of terms and sources to inhibit associations for acquiring a collection of responsive content;
   an inclusion list to provide a plurality of terms and sources restricting associations for said step of acquiring a collection of responsive content; and
   a stop list to provide a plurality of terms to be excluded.

22. The method of claim 18, wherein the processing means comprises:
   a first evaluation means to compare a listing of candidate databases to a categorization structure to determine a listing of qualified databases;
   a configuration means to create a configuration file to serve as a translator between a generic query and each qualified database;
   a responsive determination means to determine responsive databases among the qualified databases;
   an evaluation means to evaluate the responsive pages for relevance; and
   an acquisition means to acquire documents from the responsive pages.

23. The method of claim 22, wherein the acquisition means is adapted to:
   submit one or more queries to the responsive databases;
   determine whether documents returned by the queries are stored on a central database; and
   capture and store documents that do not exist in the central database in the central database.

24. A method implemented on an information handling system for the automatic harvesting and qualification of dynamic database content comprising:
   obtaining an initial categorization structure for organizing a plurality of subject areas of information;
   obtaining a plurality of parametric information lists for optimizing operation to a user's requirements;
   obtaining a candidate database listing having a plurality of databases each having a collection of content, each one of said plurality of databases providing a dynamic response based upon a specific query;
   acquiring a listing of a plurality of qualified databases from said candidate database listing by matching each one of a candidate databases to said plurality of subject areas;
   obtaining a query from the user, said query being associated with a subject area;
   submitting said query to said plurality of qualified databases;
   acquiring a collection of responsive content from said plurality of qualified databases;
   indexing said responsive content to form an index of facilitating searching said collection of responsive content;
   publishing a summary of said collection of responsive content for review by the user.

25. The method of claim 24, wherein said step of acquiring a plurality of qualified databases further comprises:
   analyzing an initial page from each one of said plurality of qualified databases for formatting;
   determining an input location on said initial page for passing queries by said initial page to each one of said plurality of databases;
   analyzing a results page from each one of said plurality of qualified databases for formatting;
   determining results locations on said results page for capturing search results returned from each one of said plurality of databases;
   recording said input location and said results locations for use in formatting queries for each one of said databases.

* * * * *